US012689781B2

(12) United States Patent
Docherty et al.

(10) Patent No.: US 12,689,781 B2
(45) Date of Patent: *Jul. 21, 2026

(54) MANAGING FEATURE DISTRIBUTION

(71) Applicant: ThinkAnalytics Ltd., Glasgow (GB)

(72) Inventors: Peter Docherty, Glasgow (GB);
Christopher McGuire, Glasgow (GB);
Ewen Cattanach, Glasgow (GB);
Darren Callaghan, Glasgow (GB);
Georgios Mamakis, Glasgow (GB)

(73) Assignee: ThinkAnalytics Ltd., Glasgow (GB)

( * ) Notice: Subject to any disclaimer, the term of this
patent is extended or adjusted under 35
U.S.C. 154(b) by 0 days.

This patent is subject to a terminal disclaimer.

(21) Appl. No.: 18/882,483

(22) Filed: Sep. 11, 2024

(65) Prior Publication Data

US 2025/0008176 A1      Jan. 2, 2025

Related U.S. Application Data

(63) Continuation of application No. 18/130,889, filed on
Apr. 4, 2023, now Pat. No. 12,114,030.

(51) Int. Cl.
H04N 21/254      (2011.01)
G06F 16/435      (2019.01)
(52) U.S. Cl.
CPC ......... H04N 21/254 (2013.01); G06F 16/437
(2019.01)
(58) Field of Classification Search
CPC ............... H04N 21/254; H04N 21/251; H04N
21/25891; G06F 16/437; G06F 16/9535
See application file for complete search history.

(56) References Cited

U.S. PATENT DOCUMENTS

| | | | |
|---|---|---|---|
| 6,567,814 | B1 | 5/2003 | Bankier et al. |
| 7,805,129 | B1 | 9/2010 | Issa et al. |
| 9,699,491 | B1 | 7/2017 | Docherty et al. |
| 9,756,390 | B1 | 9/2017 | Docherty et al. |
| 9,906,837 | B1 | 2/2018 | Docherty et al. |
| 9,973,797 | B1 | 5/2018 | Docherty et al. |
| 10,091,555 | B1 | 10/2018 | Docherty et al. |
| 10,289,739 | B1 | 5/2019 | Docherty et al. |
| 10,356,035 | B1 | 7/2019 | Gravino et al. |
| 10,412,454 | B2 | 9/2019 | Docherty et al. |
| 11,212,584 | B2 | 12/2021 | Docherty et al. |
| 11,343,573 | B2 | 5/2022 | Docherty et al. |
| 2003/0106064 | A1 | 6/2003 | Plourde |
| 2007/0083894 | A1* | 4/2007 | Gonsalves ............... H04N 7/10 |
| 2007/0157222 | A1 | 7/2007 | Cordray et al. |
| 2008/0304812 | A1 | 12/2008 | Jin |
| 2010/0005492 | A1 | 1/2010 | Takano et al. |

(Continued)

FOREIGN PATENT DOCUMENTS

| | | | |
|---|---|---|---|
| EP | 1 317 143 A1 | 6/2003 | |
| EP | 2 207 348 A2 | 7/2010 | |

(Continued)

*Primary Examiner* — Anthony Bantamoi
(74) *Attorney, Agent, or Firm* — Foley & Lardner LLP

(57) ABSTRACT

A method of managing feature distribution in content of a
content catalog for a content distribution system having a
plurality of users is provided. The method comprises taking
corrective action responsive to determining that a number of
content items in a content catalog tagged with a feature
exceeds a threshold.

18 Claims, 6 Drawing Sheets

(56)     References Cited

U.S. PATENT DOCUMENTS

| | | | |
|---|---|---|---|
| 2010/0070507 A1 | 3/2010 | Mori | |
| 2011/0243529 A1 | 10/2011 | Oryoji et al. | |
| 2014/0149344 A1 | 5/2014 | Pudipeddi et al. | |
| 2014/0279756 A1 | 9/2014 | Whitman | |
| 2015/0082330 A1 | 3/2015 | Yun et al. | |
| 2015/0100987 A1 | 4/2015 | Whitman et al. | |
| 2015/0269488 A1* | 9/2015 | Galai ...................... | H04L 67/22 |
| 2017/0068870 A1* | 3/2017 | Lindholm ............... | G06F 17/30 |
| 2017/0311015 A1 | 10/2017 | Docherty et al. | |
| 2020/0252690 A1 | 8/2020 | Docherty et al. | |
| 2021/0097126 A1* | 4/2021 | Martini .............. | G06F 16/9574 |

FOREIGN PATENT DOCUMENTS

| | | | |
|---|---|---|---|
| GB | 2 574 581 A | 12/2019 | |
| WO | WO-01/15449 A1 | 3/2001 | |
| WO | WO-02/27526 A1 | 4/2002 | |
| WO | WO-2008/042242 A2 | 4/2008 | |
| WO | WO-2013/130834 A1 | 9/2013 | |
| WO | WO-2013/186061 A1 | 12/2013 | |

* cited by examiner

MANAGING FEATURE DISTRIBUTION

CROSS-REFERENCE TO RELATED APPLICATIONS

This application is a Continuation of U.S. patent application Ser. No. 18/130,889, filed Apr. 4, 2023, entitled "MANAGING FEATURE DISTRIBUTION" the contents of which are incorporated herein by reference in its entirety for all purposes.

TECHNICAL FIELD

The present disclosure relates generally to a content distribution system and method, and in particular, to a method and system of managing feature distribution and/or content in a content catalog.

BACKGROUND

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new. For example, personal video recorders have the capability of recording and storing content items from live linear television broadcasts and downloading and storing content items from video on demand services. As such, the content items stored on such devices provide a content source that is unique to the owner of the personal video recorder.

The large choice of content and the increased variety of content sources has led to various technical developments to enable users to better access and select content, for example developments to electronic programme guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers.

It has been suggested to provide viewers with content recommendations, which may lead them more rapidly to content that may be of interest. For example, applicant's own U.S. Pat. No. 11,343,573, the relevant portions of which are incorporated herein, describes such a content recommendation system. Such a recommendation system may be based on user data. Further, such a recommendation system may incorporate data on the content, i.e., metadata. Managing this content data may become difficult and/or cause performance degradation if a large amount of data must be loaded and/or searched in order to make content recommendations. Accordingly, it is an object of this disclosure to address or ameliorate one or more of these issues.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the disclosure may or may not address one or more of the background issues.

SUMMARY

In TV systems, or other systems for provision of content to a user, each service provider may have thousand, tens or hundreds of thousands, or millions of customers, wherein each customer is unique and may have different viewing habits and preferences. It has been recognized that each user may require different content recommendations. Tracking, recording and processing large volumes of customer data together with large amounts of content data in order to provide a personalized recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with over one million content recommendation demands per minute during busy periods.

A content recommendation system is able to provide recommendations in real time or near real time for many thousands, tens of thousands, hundreds of thousands, or even tens of millions, or more users. An exemplary content recommendation system is described in applicant's own U.S. Pat. No. 11,343,573, the relevant portions of which are incorporated herein.

Content recommendations may be based on user data, user actions and/or content data. Content data may include metadata related to the content. User data and actions may be used to build a user history or profile which is used in generating personal content recommendations for the user. Content recommendations may be based on learn action. Learn actions may be records of user activity, e.g., each time a particular user has watched or recorded a programme at any time during the previous six months or other relevant time period.

In some embodiments, content recommendations may be provided while restricting or not allowing access to personal information, or data that could be used to determine the name of a user, or demographic information concerning the user. This will ensure user anonymity and privacy are maintained. Learn actions may be determined without obtaining, recording or accessing any such personal and potentially private user information.

Content data may be referred to a feature of the content. A content catalog may include thousands if not millions of content items. Each content item may have multiple features associated with it. The features may be set when loading an entire content catalog. Loading an entire content catalog is referred to a batch ingest. Additionally or alternatively, updates to a content catalog may be loaded where a lesser number of content items are loaded and the associated features are set. This is referred to as an incremental ingest.

Features (i.e., metadata) may be assigned and provided by the content creator. Alternatively or additionally, features may be added to the content by a content distributor. Assigning or adding features may be referred to as tagging content items with the features. Assigning or adding features to a content item may comprise associated metadata with a content item. As such, a content item tagged may be a content item which has associated metadata which indicates the content item has the feature. The feature may be a director, writer, actor, genre, mood, running time, rating, style, type, release date, production date or other characteristic or element of the content item. Like content items have like features tagged to them. For example, true crime films may be tagged with a "true crime" feature.

For example, the content creator may add an "action" tag to all movies in the "Mission Impossible" series of films. The content distributor may receive these content items tagged with the action feature. The content distributor may then add further metadata to these movies, i.e., tag the content items with additional features. This may be done to provide further granularity to the content items. This may improve the quality of a user profile build from a user's viewing habits of the content items, and therefore improve the quality of content recommendations to that user based on the user profile. For example, the content distributor may add director information each film, e.g., Brian De Palma as the director of the "Mission Impossible" film and John Woo as the director of "Mission Impossible 2" film. The described feature tagging may be performed during a batch ingest and/or an incremental ingest.

During the tagging of one or more content items with features, the exact distribution of features in the entire content catalog may not be known. In other words, the number of content items having the tagged feature may be unknown. For example, the feature of "unscripted" may be added to some content items, while "scripted" is added to remaining content items. It may be that the number of content items tagged with the scripted feature represent close to half the percentage of content items, e.g., 40% of all content items. Such a high distribution of feature presence in a content catalog may be referred to a biased feature.

When a content recommendation is being prepared in response to a content recommendation request from a user, a content recommendation system may search through 40% of all content items on the basis of a user profile indicating a preference for scripted content items. As hundreds, thousands, tens of thousands or even more content recommendations are being provided every second, such biased feature may cause performance degradation to the content recommendation system.

Further, biased features may affect the user profile. This may affect the user recommendations. As more content items match a feature, the higher the probability the feature ending up in the user profile. If a user views a content item which has been tagged with the feature, the user profile may then indicate a preference for content items with that feature. A content recommendation may be based on a user feature vector. The user feature vector is in the user profile and is reflective of user's preference for content items with the feature. The content recommendation may thus recommend content with the feature. However, as this feature is a biased feature, i.e., present in a high number of content items, the content recommendation may be inaccurate as it is affected by the biased feature. The higher the relevance of a feature in the user feature vector and the larger the number of content items matching the feature, the more the bias of the content recommendation system to recommend from content items including the feature. Further, differentiating features, i.e., features which are not biased, that should be more important in providing an accurate content recommendation, may contribute less to the overall content recommendation, as they tend to have a lower weight than the biased features. Overlapping features may also be problematic as they may become more common. For example, the features of "news" and "current affairs" may be present in multiple content items. This may negatively impact content recommendations as both these features may have a high score and impact the user profile thereby biasing content recommendations. Further, this may negatively impact system performance.

Additionally, certain content may have multiple instances in a content catalog further exacerbating the discussed issues. For example, one program may be aired on a first channel at one time during the day, and then a second time on the same day, e.g., a repeating movie, episode or news program. Features present in multiple events of the same content may therefore be doubly counted as multiple content items, or multiple events/instances of the same content item. This may further exaggerate the biasing of features.

Accordingly, it is an object of the disclosure to at least partially address one or more of these issues.

According to an aspect there is provided a method of managing feature distribution in content of a content catalog for a content distribution system having a plurality of users, the method comprising taking corrective action responsive to determining that a number of content items in a content catalog tagged with a feature exceeds a threshold.

The method may be performed for multiple features. In other words, the method may comprise taking a first corrective action responsive to determining that a first number of content items in a content catalog tagged with a first feature exceeds a first threshold, and taking a second corrective action responsive to determining that a second number of content items in a content catalog tagged with a second feature exceeds a second threshold. The first and second corrective actions may be same or different. The first and second numbers may be the same or different. The first and second thresholds may be the same or different.

The content catalog may form part of the content distribution system. The content catalog may be stored on a storage resource such a hard disk storage or in online "cloud" storage.

Feature distribution may refer to the distribution, i.e., the number of instances of a feature, through the content catalog, i.e., across all of the content items in the content catalog.

The feature may be present in a user profile.

The method may further comprise determining the one or more features in the user profile. The method may further comprise determining that a feature is present in a user profile of a user of a plurality of users of a content distribution system. The determining may be performed when loading a user profile for use in generating a content recommendation request. The user profile may be stored in a storage resource. The storage resource may be a second storage resource which comprises random access memory (RAM) or cache memory. The content catalog may be stored in a first storage resource. The first storage resource may be a hard disk storage. The user profile may also be stored on the first storage resource.

The first storage resource may comprise at least one of a remote storage resource and a less rapidly readable storage resource, and/or the second storage resource may comprise at least one of a local storage resource and a more rapidly readable storage resource.

The method may comprise determining the one or more features in the user profile stored in the second storage resource. The user profile may also be stored in the first storage resource. The second storage resource may be more rapidly readable than the first storage resource.

The first storage resource may comprise a hard disk storage resource and the second storage resource may comprise random access memory (RAM).

The user profile stored in the second storage resource may be used in real-time for content recommendation, while the user profile stored in the first storage resource is not accessed for real-time content recommendations.

Taking corrective action may comprise modifying a weight of a user feature vector of the user profile stored in the second storage resource. The user feature vector may correspond to the feature. Modifying the weight of the user feature vector may comprise setting the weight to zero, or removing the user feature vector such that this user feature vector. A content recommendation based on the user profile having such a modified user vector may ignore the user feature vector and therefore not review the content items which include the biased feature which may cause performance degradation. Further, modifying the user profile stored in the second storage resource may be faster than accessing the first storage resource. Additionally, the integrity of the user profile stored in the first storage resource may be maintained.

The method may further comprise determining the number of content items tagged with the feature. The determining may occur during a batch ingest and/or an incremental ingest. The determining may occur when one or more content items are being tagged with the feature. The content items may be tagged with the feature which is one of a set of features.

The determining may occur as features (metadata) of the content items are changing incrementally. This may during an incremental ingest. Additionally, this may as features are simply being added to existing content items.

Determining the number of content items tagged with the feature may occur in response to a trigger event. The trigger event may be a period of time elapsing. As such, the determining may occur according to a schedule, e.g., every 12 hours. The trigger event may comprise a number of batch or incremental thresholds exceeding a threshold. For example, the method may determine the number of content items with the feature after 10 incremental ingests. The trigger event may comprise detecting that one or more response times to content recommendation requests exceed a threshold, e.g., 10 ms. Exceeding a pre-set threshold may indicate performance degradation due to biased features. Determining the number of content items tagged with the feature and then taking corrective action may reduce the response times and improve system performance.

The feature may represent one of a set of features. Determining may comprise determining the number of content items tagged with each one of the features in the set of features. For example, the set of features may comprise a mood of the content items with the feature set comprising: amusing, suspenseful, light-hearted, funny, scary, tense, weird, sad, and shocking.

Determining may comprise:
  determining a distribution of the feature in the tagged content items and untagged content items; and
  determining if the number of tagged content items in the distribution exceeds the threshold. The tagged content items and the untagged content items may represent the total content items.

Determining may comprise:
  determining that a first number of tagged content items is greater than a second number of tagged content items, the first number of tagged content items tagged with a first feature and the second number of tagged content items tagged with a second feature. The first and second features may be part of the set of features.

Taking corrective action may comprise adding the feature of a list of features. The list of features may represent features which should be used in content tagging, or should be ignored or otherwise negated when loading content or a user profile. For example, if the features "scripted" or "unscripted" exceed the threshold, both features may be added to the list of features. Upon loading another set of content items and identifying tagging feature therein, i.e., an incremental ingest, the features "scripted" or "unscripted" may not be tagged to any of the content items in the set even if they are present. Similarly, when a user profile in loaded in into storage, e.g., the secondary storage for use in generated a content recommendation, user feature vectors for the features "scripted" or "unscripted" may be ignored in the content recommendation generation.

The method may further comprise communicating the list of features, i.e., the list of biased features, to elements, components of a content recommendation system. The method may further comprise communicating the list of features to a content recommendation engine (CRE) for receiving one or more content recommendation request and providing one or more content recommendations based on a user profile.

The method may further comprise communicating the feature to elements, components of a content recommendation system. The method may further comprise communicating the feature to a content recommendation engine (CRE) for receiving one or more content recommendation request and providing one or more content recommendations based on a user profile.

The corrective action may comprise communicating the feature to elements, components of a content recommendation system. The corrective action may comprise communicating the feature to content recommendation engine (CRE) for receiving one or more content recommendation request and providing one or more content recommendations based on a user profile.

The CRE may ignore the feature if the feature is present in any user profiles used for generating one or more content recommendations.

Taking corrective action may comprise:
  taking corrective action in in response to determining that the first number of tagged content items is greater than the second number of tagged content items.

Taking corrective action may comprise:
  de-tagging the first feature from the first number of tagged content items and maintaining the second feature from the second number of tagged content items. De-tagging may comprise remove a feature from a content item. De-tagging may comprise removing, deleting and/or overwriting metadata associated with the content item.

The method may further comprise, prior to the determining, tagging one or more content items with the feature. The tagging may occur during a batch ingest and/or an incremental ingest.

Taking corrective action may comprise at least one of:
  de-tagging the feature from the content items,
  ignoring the feature in a content scoring function, or.
  communicating the feature to a content recommendation engine (CRE), the CRE adapted to generate one or more content recommendations responsive to one or more content requests from a user of a plurality of users.

The content scoring function may be used to generate a content recommendation. The content scoring function may be applied to a user profile to provide the content recommendation.

The CRE may generate a content recommendation based on a user profile. By communicating the feature to the CRE, the CRE may ignore a user vector in the user profile which corresponds with the feature.

Taking corrective action may comprise notifying a client that the threshold has been exceeded. The client may be a content owner, creator or provider.

Taking corrective action may comprise generating a report of the number of tagged content items. The method may comprise displaying the report to the client. The report may comprise one or more of the features which exceed the threshold. The report may comprise the distribution of the feature, or features, which exceed the threshold across content items.

Taking corrective action may comprise removing the feature from the tagged content items.

Removing the feature may comprise de-tagging the feature from the tagged content items.

Removing the feature may be performed by a content recommendation engine (CRE). The CRE may form part of a content recommendation system.

The corrective action may prevent performance degradation. The performance degradation may be associated with a content recommendation request to a content recommendation engine (CRE), the CRE for generating one or more content recommendations responsive to one or more content recommendation requests from a user of a plurality of users of the content distribution system. The performance degradation may negatively impact generation of content recommendations. The performance degradation may increase the amount of time required to generate one or more content recommendations. In particular, a biased feature may require a large portion of a content catalog to be searched in order to generate a content recommendations thereby increasing the time to provide a content recommendation.

The threshold may be a percentage of a total number of content items.

The percentage may be greater than or equal to 10% of the total number of content items.

Taking corrective action may comprise modifying a scoring function. The scoring function may include features of a user profile. The scoring function may be a function for use when generating a content recommendation. The scoring function may be used to score content items when generating a content recommendation. The scoring function may be stored in or on a storage resource. The scoring function may be stored on first and second storage resources.

The first storage resource may comprise at least one of a remote storage resource and a less rapidly readable storage resource, and/or the second storage resource may comprise at least one of a local storage resource and a more rapidly readable storage resource. The second storage resource may be more rapidly readable than the first storage resource.

The first storage resource may comprise a hard disk storage resource and the second storage resource may comprise random access memory (RAM).

The scoring function stored in the second storage resource may be used in real-time for content recommendation, while the scoring function stored in the first storage resource is not accessed for real-time content recommendations.

Taking corrective action may comprise modifying the scoring function stored in the second storage resource, but not the scoring function stored in the first storage resource. In other words, the scoring function stored in the first storage resource may remain unchanged, while the scoring function stored in the second storage resource is modified.

A content recommendation based on the scoring function which has been modified may therefore result in the content items which include the biased feature not being searched during a content recommendation which would otherwise cause performance degradation. Further, modifying the scoring function stored in the second storage resource may be faster than accessing the first storage resource. Additionally, the integrity of the scoring function stored in the first storage resource may be maintained.

Modifying the scoring function may comprise reducing a weight of a user feature vector. The user feature vector may form part of a user profile. The user feature vector may indicate a user preference for content items including the feature, i.e., content items for which associated metadata includes the feature. Modifying the weight may comprise setting the weight of the user feature vector to zero or null. This effectively disregards the features from the user's profile.

The scoring function may comprise:

$$\left( \sum \left( wf_u^i * wf_s^i \right) \right) * c_{rec} * c_{pop}$$

wherein $$\omega f_u^f$$

is a weight of a tagged feature i for a user u, wherein $$\omega f_u^f$$

is a weight of a tagged feature i for a seed item s, wherein $c_{rec}$ is a recency coefficient, and wherein $c_{pop}$ is a popularity coefficient.

The seed item may represent a content item for comparison. For example, if the scoring function is for related content, the seed item may be the original content item to which related content items are meant to be related. The recency coefficient may set a preference for more recently released content compared to older content. The popularity may similarly set a preference for more universally popular content compared to less popular content.

According to another aspect there is provided a method of managing feature distribution in content of a content catalog for a content distribution system having a plurality of users, the method comprising:

determining that a feature is present in a user profile of a user of a plurality of users of a content distribution system; and taking corrective action responsive to determining that a number of content items in a content catalog with the feature exceeds a threshold.

According to another aspect there is provided a method of managing content of a content recommendation system, the content recommendation system comprising a content recommendation engine (CRE) for generating one or more content recommendations responsive to one or more content requests from a user of a plurality of users, the method comprising:

determining that a number of tagged content items exceeds a threshold, the content items tagged with a feature; and taking corrective action in response to determining the number of tagged content items exceeds the threshold.

According to another aspect there is provided a method of managing feature distribution in content items of a content catalog for a content distribution system having a plurality of users, the method comprising:

identifying a feature matching a content item of a content catalog;

determining a number of content items in the content catalog which match the feature;

determining if the number of content items exceeds a threshold; and taking corrective action in response to determining the number of content items exceeds the threshold.

These aspects may include any of the additional features or elements described in respect of the first aspect.

According to another aspect there is provided a non-transitory computer-readable medium having computer program code stored thereon, the program code executable by a processor to perform any of the described methods.

According to another aspect there is provided a content recommendation system comprising a content recommendation engine (CRE) for generating one or more content recommendations responsive to one or more content requests from a user of a plurality of users and a feature management module, the feature management module adapted to:

determine that a number of tagged content items exceeds a threshold; and take corrective action in response to determining the number of tagged content items exceeds the threshold.

According to another aspect there is provided a content recommendation system comprising a content recommendation engine (CRE) for generating one or more content recommendations responsive to one or more content requests from a user of a plurality of users and a feature management module, the feature management module adapted to perform any of the described methods.

The feature management module may be further adapted to:

tag one or more content items with a feature.

The feature management module may be adapted to notify a client that the threshold has been exceeded.

The feature management module may be adapted to generate a report of the number of tagged content items.

The CRE may be adapted to remove the feature from the tagged content items.

The feature management module may be adapted to remove the feature from the tagged content items.

The feature management module may be adapted to de-tag the feature from the tagged content items.

The feature management module may be adapted to modify a scoring function of one or more content items.

The described methods may be computer-implemented, i.e., implemented by a computer processor.

Features in one aspect may be provided as features in another aspect. For example, method features may be provided as apparatus features and vice versa.

BRIEF DESCRIPTION OF THE FIGURES

Various aspects of the invention will now be described by way of example only, and with reference to the accompanying drawings, of which.

DETAILED DESCRIPTION

In TV systems, or other systems for provision of content to a user, each service provider may have thousand, tens or hundreds of thousands, or millions of customers, wherein each customer is unique and may have different viewing habits and preferences. It has been recognized that each user may require different content recommendations. Applicant's own U.S. Pat. No. 11,343,573, the relevant portions of which are incorporated herein, describes a content recommendation system for providing content recommendations. The recommendations may be based on user data. Additionally, the recommendations may be based in a user inputted search term.

Tracking, recording and processing large volumes of customer data together with large amounts of content data in order to provide a personalized recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with hundreds of thousands, or over one million content recommendation demands per minute during busy periods.

Figure 1:
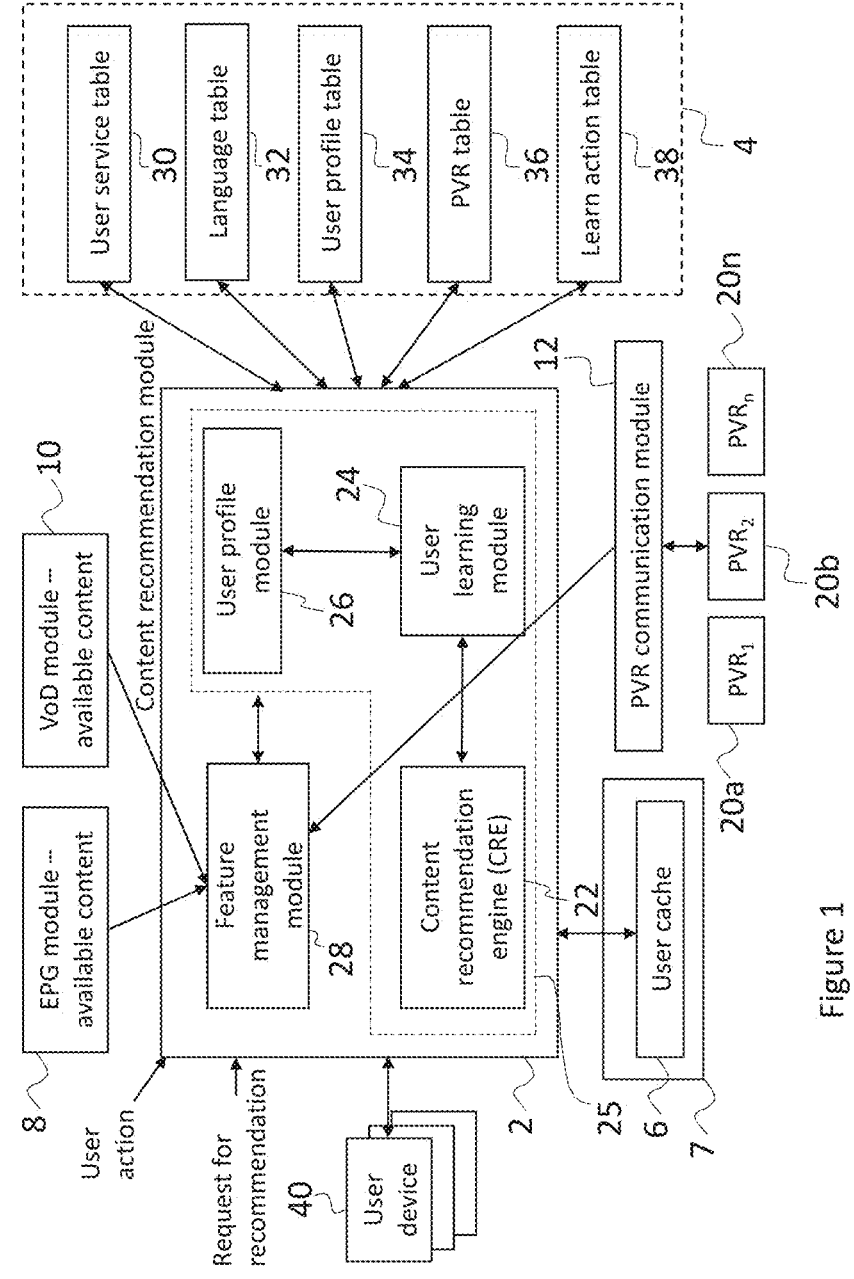
FIG. 1 is a schematic diagram of a digital content recommendation system.

FIG. 1 shows a schematic diagram of a digital content recommendation system according to an embodiment. The system is able to provide content recommendations in real time or near real time for many thousands, tens of thousands, or even hundreds of thousands, or even tens of millions, or more users. Example modes of operation are described below in relation to PVRs associated with users, but content recommendations may be provided to or in respect of any suitable users or user accounts, with recommended content being provided or accessible via any suitable devices, for example set-top boxes, smartphones, PCs or tablets or any other suitable content delivery mechanism.

The system comprises a content recommendation module 2 linked to a first storage resource in the form of a hard disk storage resource 4, which is used to store various user data. The content recommendation module 2 is also communicatively linked to a second storage resource in the form of a local storage resource that includes at least one cache, for example a user cache 6. In the embodiment of FIG. 1 the local storage resource is in the form of RAM 7, but any suitable storage resource may be used in alternative embodiments. The user cache 6 may be used for temporary storage of user data obtained from the hard disk storage resource 4 during a content recommendation session, as discussed in more detail below. While the system has been illustrated and described as comprise first and second storage resources, one of skill in the art will appreciate more or less storage resources may be present. For example, the system may comprise a single storage resource. The storage resource may comprise a hard disk storage resource.

The content recommendation module is able to communicate, either directly or indirectly, and either via wired or wireless connection, with very large numbers of users or user devices 40 and to provide recommendations for or derived from such users or user devices. Other than some PVRs which are shown schematically in FIG. 1, only a few user devices 40 are not shown in FIG. 1 for clarity. The user devices 40 may include, as examples only, a user's mobile phone, smart TV, tablet computer, laptop, smart watch or other suitable viewing device. Although the user devices 40 could belonging to a user, they could also comprise any other device that the user is logged into.

The content recommendation module 2 is also linked to sources of information concerning available content, in this case an EPG module 8 and a Video-on-Demand (VoD) module which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VoD module 10, Content Recommendation Module 2, the User Cache 6, the PVR Communication module 12 and the EPG module 8 are implemented in a server. The server includes communication circuitry that enables communication between the server, or appropriate components of the server with each of the user devices, and with the content sources, for example a TV service operator or other content service operator.

Any other suitable implementation of the EPG module 8, the VoD module 10, content recommendation module 2, the user cache 6, the PVR communication module 12 and the EPG module 8 may be provided in alternative embodiments, for example they may be implemented in any software, hardware or any suitable combination or software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VoD module 10 may also be enriched with additional metadata, for example by the operator of the content recommendation system, such that additional metadata to that provided by the content sources or other external sources may be stored.

In the embodiment of FIG. 1 the content recommendation server, in particular the content recommendation module 2, communicates directly with each of the user devices, for example to receive user action data, to determine when a content recommendation is required for a particular user, and to supply content recommendations to the user devices. In alternative embodiments, the content recommendation module 2 communicates with the user devices via the content sources or via other servers or devices. For example, in such alternative embodiments, the user action data may be sent to the content recommendation server via one of the content source servers or other server or device, and the content recommendations may be sent to the user devices from the content recommendation module 2 via the content source servers or other server or device.

In the embodiment of FIG. 1 the system operates together with three sources of content for a user device: real-time linear television, for example terrestrial or satellite broadcast television; one or more video-on-demand (VoD) services, and pre-recorded video content stored on one or more personal video recorders (PVR). In alternative embodiments further sources of content as well as or instead of those shown may be used.

The operation of the digital content recommendation system is controlled by the content recommendation module 2. As can be seen in FIG. 1, the content recommendation module 2 is configured to communicate with the one or more content information modules: the electronic programme guide (EPG) module and VoD module 10. The content recommendation module 2 is also configured to communicate with the user cache 6 local to the content recommendation module 2, the hard disk storage resource 4 and the one or more PVRs. A data access layer provides a communication interface between the content recommendation module 2 and the hard disk storage resource 4. A personal video recorder (PVR) communication module 12 provides a communication interface between the one or more PVRs 20a, 20b, . . . 20n and the content recommendation module 2.

The content recommendation module 2 has a content recommendation engine (CRE) 22, a user learning module 24 and a user profile module 26. The content recommendation module 2 further includes a feature management module 28. The CRE 22, user learning module 24 and user profile module 26 may be included in a recommendation service 25.

The CRE 22 applies a set of processes to determine, in real time, content recommendations for a user based on user data, an inputted search term and available content. The user learning module 24 receives data indicative of selections or other actions by a user and builds up a set of user data, for example comprising or representing a user history or profile, which is stored in the hard disk storage 4, and which is used in generating personalized recommendations for the user. The recommendation service 25 may further include a search module (not shown) which receives an inputted search term and generates a search request for the CRE 22. The CRE 22 receives the search request and conducts a search for content pursuant to the search request. Operation of the CRE 22 is discussed in more detail below.

Figure 3:
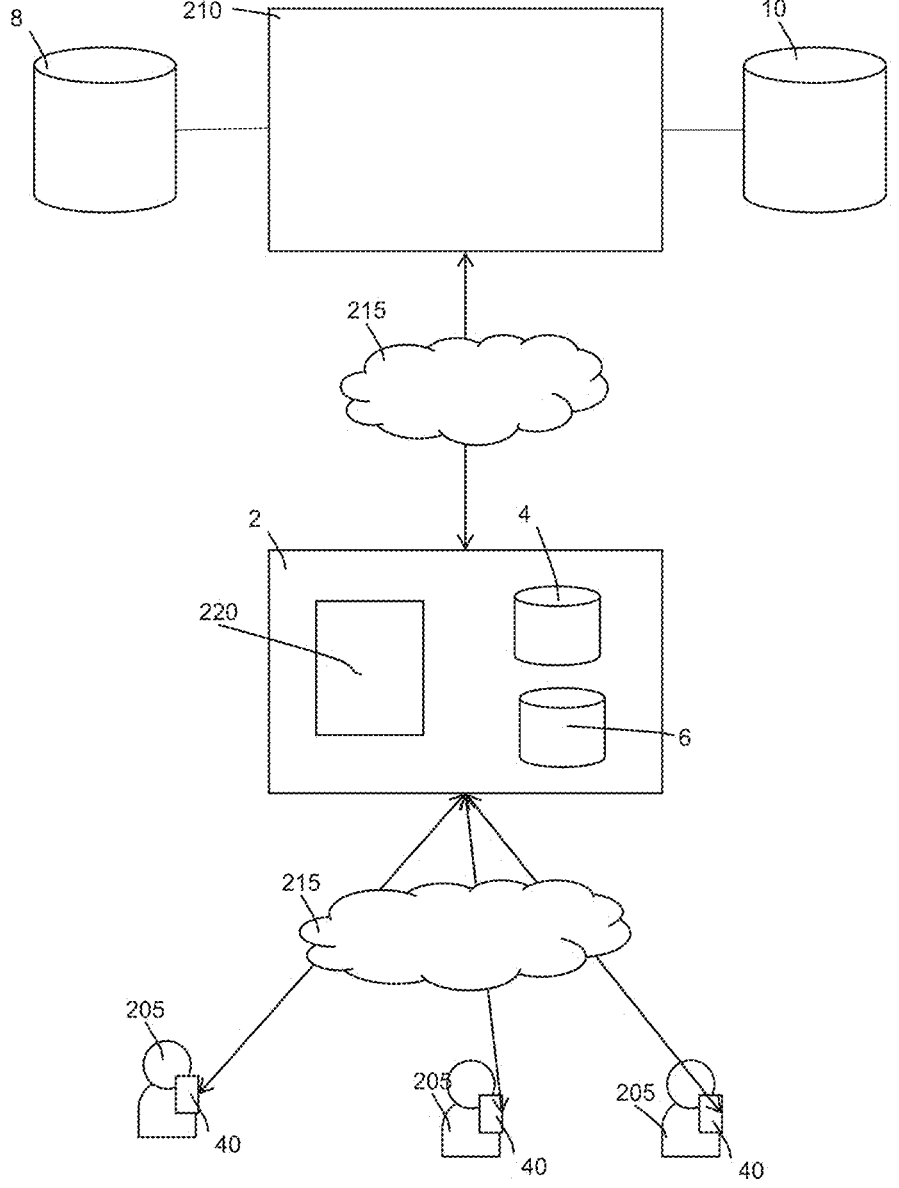
FIG. 3 is a simplified schematic of the system of FIG. 1.
Figure 4:
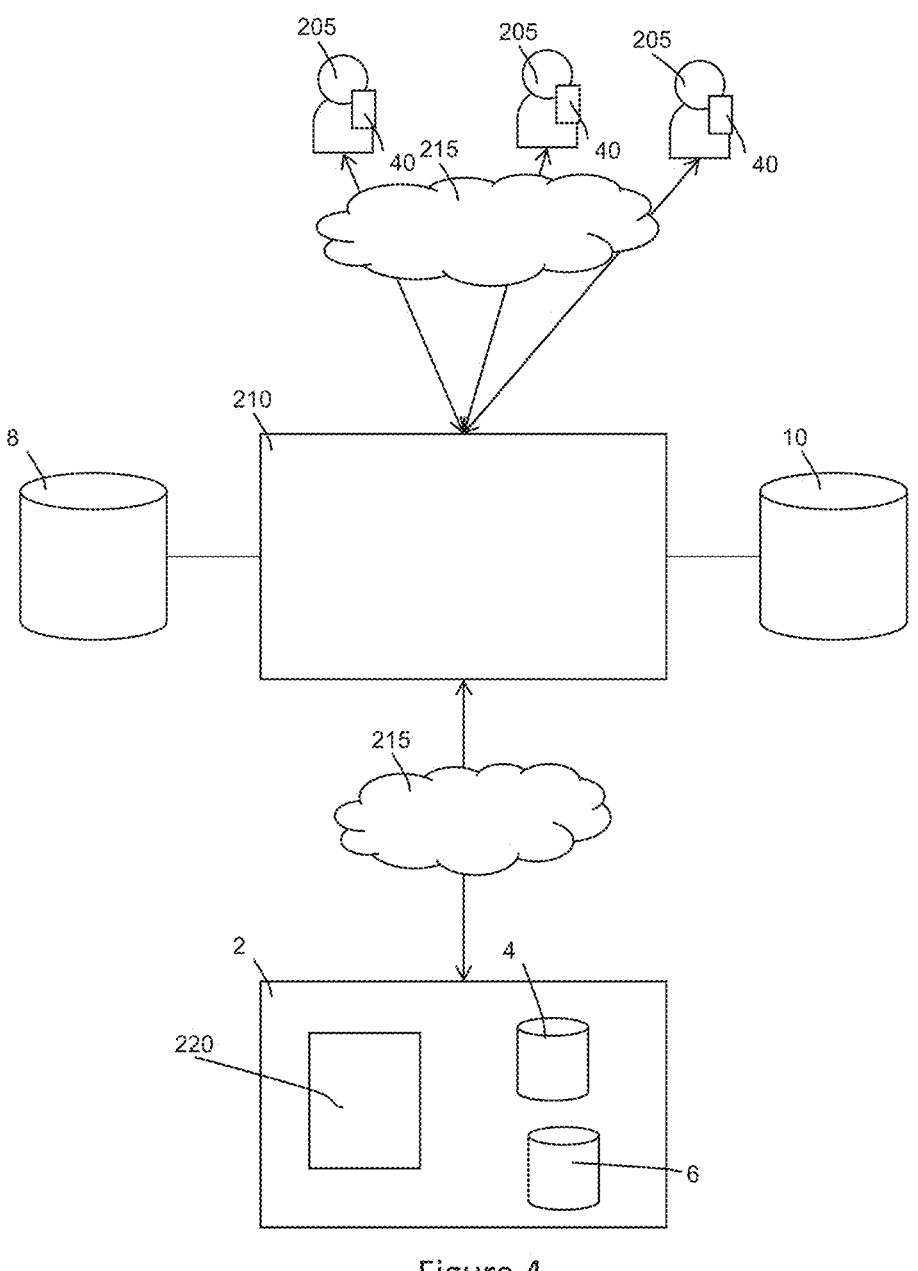
FIG. 4 is a simplified schematic of an alternative system arrangement to that of FIG. 3.

The content recommendation module 2 further includes a user experience (UX) engine (not shown) for configuring user content selection interfaces that allow users 205 (see FIGS. 3 and 4) to navigate and select content from a content service provider (210, also shown in FIGS. 3 and 4). In particular, the UX engine can be used to provide customised user content selection interfaces that are customised or otherwise specifically configured to a specific user 205 or group of users 205. The customization comprises customizing the order in which groups of content is presented to a user 205 or groups of users 205 so that groups of content more likely to be of interest to the user 205 are presented earlier, or in preference to groups of content that are less likely to be of interest to that user 205.

As described, the content recommendation module 2 further includes the user profile module 26 as part of the recommendation service 25. The user profile module 26 is operable to use first party data obtained by an operator of the system to determine user activity profiles of individual users 205 or sets of users 205, which are representative of actions of a user 205 with respect to content selection interfaces.

The user profile module 26 generates a user profile based on user data, such as learned actions which may be generated when a user views a content item period of time. The user profile provides an indication of user content preferences. Specifically, the user profile may comprise a number of user vector which indicate preferences for certain features. The user profile module 26 stores the user profile in the hard disk storage 4. However, when a content recommendation is to be generated by the CRE 22, the user profile may be copied to the cache 6 to allow for faster processing by the CRE 22. As will be described, a user feature vector of the user profile stored on the cache 6 is modified, e.g., a weight may be decreased, potentially to zero, when a bias feature is discovered. However, the user feature vector of the user profile stored in the hard disk storage 4 may be unmodified.

The content recommendation module 2 further includes a feature management module 28. The feature management module 28 receives content items for ingest from one or more of a plurality of sources such as the EPG module 8, VoD module 10 and PVR communication module 12 connected to the PVRs 20. Further, the feature management module 28 may alternatively or additionally receive a user profile from the user profile module 26.

As will be described in more detail, the feature management module 28 manages feature distribution in content of a content catalog. The content catalog may be the content catalog of any one or more of the EPG module 8, VoD module 10 and the PVRs 20 connected to the PVR communication module 12. The feature management module 28 takes corrective action if the feature distribution, i.e., the number of content items in the content catalog, with the feature (i.e., content items which have metadata which includes the feature) exceeds a threshold. Further, the feature management module 28 determines if a feature is present in a user profile in the user profile module 26, and takes corrective action if the number of content items with that feature exceeds a threshold. Thus, the feature management module 28 receives content items from various content sources, e.g., modules 8, 10, 12, and user profiles from the user profile module 26.

Figure 2:
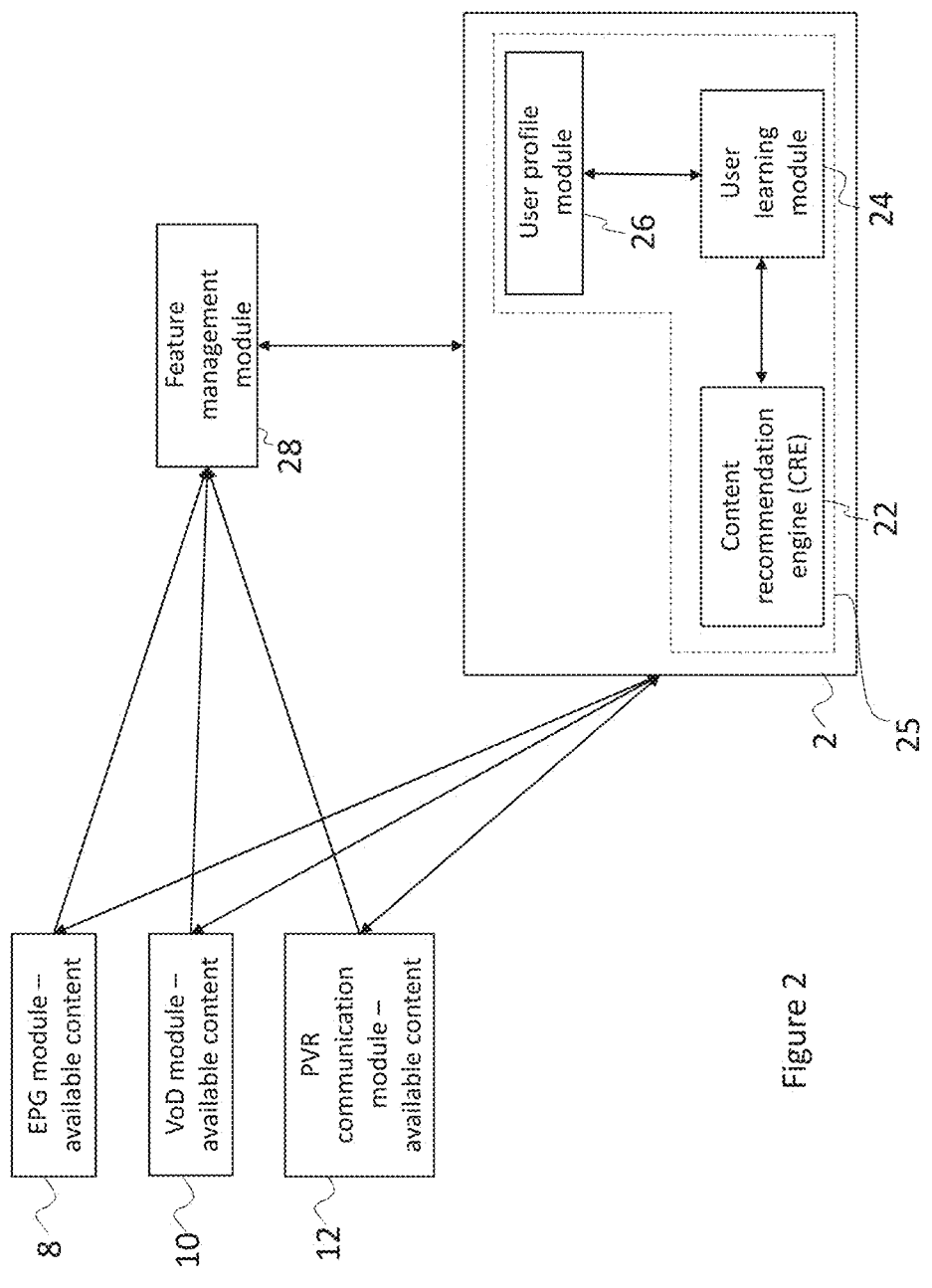
FIG. 2 is a partial schematic diagram of an alternative system arrangement to that of FIG. 1.

Although a particular system arrangement is shown in FIG. 1, there are various system arrangements that could be used. As illustrated in FIG. 2, the feature management module 28 may be separate and distinct from the content recommendation module 2. The feature management module 2 may be operated server may be implemented by a cloud computing system, by one or more servers or other suitable enterprise level computing system. As in FIG. 1, the feature management module 28 stills receive content items from various content sources, e.g., modules 8-12. Further, the feature management module 28 interfaces with the content recommendation module 2. Other elements of the system, e.g., the PVR 20, or the hard disk storage 4 are not included in FIG. 2 for clarity.

FIG. 1 shows a request for recommendation for the user being received by the content recommendation module 2. FIG. 1 also shows a user action being received by the content recommendation module 2. In addition to receiving requests for recommendations and search terms, the content recommendation module 2 is configured to log user activity. By logging user activity and storing activity over an extended period of time, the content recommendation module 2 and the hard disk storage 4 can build up an overall picture of the viewing activities, habits and preferences of a plurality of users. Certain user actions are turned into learn actions by the user learning module 24. The learn action may be processed by the user profile module 26, the UX engine 28 and the content recommendation engine 22 as well. The user profile module 26 may store user data on the hard disk storage 4 to generate and update one or more user profiles for users 205.

The system of FIG. 1 is configured to operate with a plurality of user devices (not shown) each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user device is communicatively coupled to the content recommendation module 2. The CRE 22 of the content recommendation module 2 has an application programming interface (the recommendation engine API) that provides a set of rules for search and recommendation requests to be communicated between the user device and the CRE 22. The user device is configured to send an inputted search term to the CRE 22, possibly via the search module, which returns one or more content recommendations.

The user cache 6 is coupled to the content recommendation engine 22 and is configured to store data for the content recommendation engine 22. The content recommendation module 2 can access data stored on the user cache 6. The user cache 6 may be provided in random access memory (RAM).

The hard disk storage 4 is communicatively coupled to the content recommendation module 2. The hard disk storage 4 stores data for use by the content recommendation module 2. The hard disk storage 4 is configured to store one or more databases. Entries from the databases on the hard disk storage resource 4 can be retrieved by the content recommendation module 2 via requests made through the data access layer. Entries in the databases may also be updated via the data access layer.

The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 30 that represent user service requirements, at least one language table 32, at least one user profile table 34 that includes user attribute data that may be considered to represent a user profile, a PVR table 36 and a learn action table 38.

The learned language table 32 stores data relating to audio languages of content items that have been user actioned by the user. For example, the feedback table can store learned language information, the date at which the language was learned and an indication of whether or not the entry has been aged out.

A user profile, which is stored in the user profile table 34, may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

The PVR table 32 stores metadata or other information concerning items of content stored on at least one PVR, e.g., PVR 20*a*, 20*b*, . . . 20*n*, substantially without duplication (for example, substantially the same amount of data is stored regardless of whether an item of content is stored on one, thousands or millions of PVRs) the amount of storage required, and data access times can be reduced. This can be particularly significant in systems such as that of FIG. 1 which may be required to provide real-time personalized content recommendations to thousands, tens or hundreds of thousands, or millions of users subject to strict time constraints.

Additionally, in the embodiment of FIG. 1, the tables stored on hard disk storage resource 4 may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in a learn action table 38. The learn action (i.e., stored data item) may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier).

The learning tables described, e.g., the learn action table 38, a distinction is made between different types of user and different sets of the tables are stored for the different types of users.

Although a particular system arrangement is shown in FIGS. 1 and 2, there are various system arrangements that could be used.

FIG. 3 shows a "middleware" arrangement in which the recommendation system 2 sits as "middleware" between the users 205 and systems of a content provider 210. The recommendation system 2 is implemented by processing resource 220 (which may comprise one or more processors) with the hard disk storage resource 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Other system arrangements that provide similar functionality to customize the content selection interfaces for users are possible. FIG. 4 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205.

Figure 5:
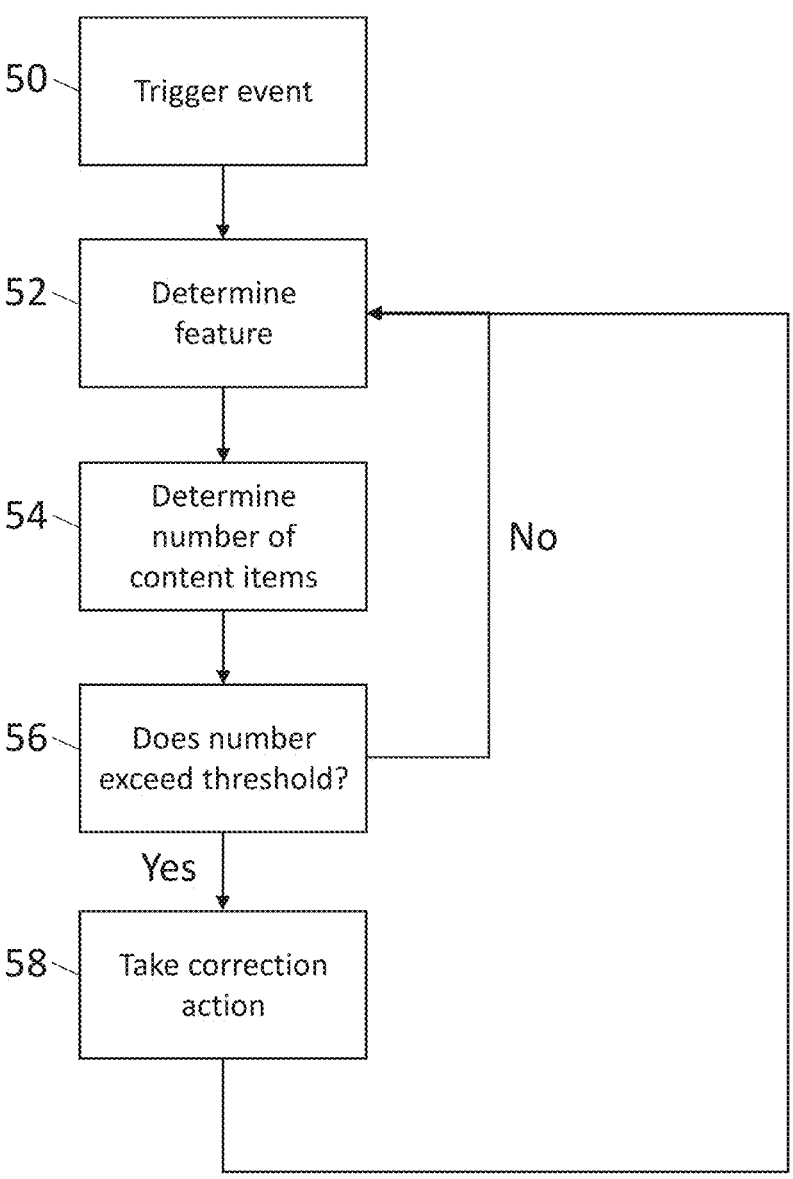
FIG. 5 is a flowchart of a method of managing feature distribution.

Returning now to FIGS. 1 and 2, operation of the feature management module 28 will now be described. As illustrated in FIG. 5, the feature management module 28 manages feature distribution in response to a trigger at step 50. The trigger event may be a batch ingest of content items of an entire content catalog or an incremental, i.e., update, ingest of content items. Incremental update ingests may occurs periodically, i.e., every day or week, while a batch ingest may occur when on-loading an entire content catalog. The trigger event may just be a period of time, e.g., 1 week, 24 hours, 12 hours, 6 hours, etc. As such, the feature management module 28 may manage feature distribution occurring to a schedule. The trigger event may be the occurrence of a number of incremental update ingests. The trigger event may be detecting The trigger event may be a combination of these various aspects. For example, the module 28 may manage feature distribution in response to: a batch ingest, 12 hours passing since the module 28 was last run, and detecting response times below a threshold time. The response times are the amount of time taken to provide a content recommendation following a content recommendation request to the content recommendation module 2. If the response times are below a threshold, it may indicate too much of the content catalog is being searched in order to generate a content recommendation request. This may indicate a biased feature. Operating the module 28 may remove the biased feature and improve response times.

At step 52, the module 28 determines the feature. The feature may one of the entire set of features present in the content catalog to be ingested (batch or incremental). However, in another embodiment the feature is one of the features present in a user profile provided by the user profile module 26. A feature in the user profile may be biased feature in that the feature is present in a greater than a threshold number of content items in the catalog. By including such a biased feature in the user profile, the content recommendation module 2 will generate a content recommendation biased on, at least in part, the biased feature. Further, as the feature is biased, it may have a relatively high score (indicating a high user preference) in the user profile. This will increase the level of impact on the content recommendation. The content recommendation may involve a search of the content catalog based on user profile. Searching a large portion of the content catalog, as a result of the biased feature in the user profile, increases response times for generating the content recommendation. The identified feature may be "series" indicating the content item belongs to a series of episodes of related content items, e.g., a season of a television program.

The user profile may be stored in the cache (a second storage resource) 6 rather than the hard disk storage 4 (a first storage resource) to improve response times. As such, the feature management module may access the cache 6 when determining or identifying a feature. The second storage resource may be a more rapidly readable storage resource than the first storage resource.

At step 54, the number of content items having the feature is determined. This is the number of content items tagged with the feature. Tagging a content item with a feature comprises identifying metadata of the content item, e.g., a genre, and associating that metadata with the content item. Determining the number of content items may involve searching through the metadata associated with the content items for matches with the feature of interest, i.e., the feature determined in step 52. At step 56, it is determined whether the number of content items exceeds a threshold. The threshold may be determined through prior experimentation. For example, it may have been determined that features which are present in greater than 10% of all content items result in performance degradation, i.e., high response times. The threshold may be pre-set prior to commencing the method of feature distribution management, i.e., set to a particular number or percentage.

If the number of content items having the feature exceed the threshold, the method proceeds to take corrective action at step 58. If the number of content items does not exceed the threshold, the method moves to the next feature, if any, remain. Thus, if the number does not exceed the threshold the method returns to step 52 to determine the next feature. Once corrective action has been taken at step 58, the method returns to step 52 to determine the next feature. If no more features remain, either in the content catalog being ingested or the user profile, the method ends.

Figure 6:
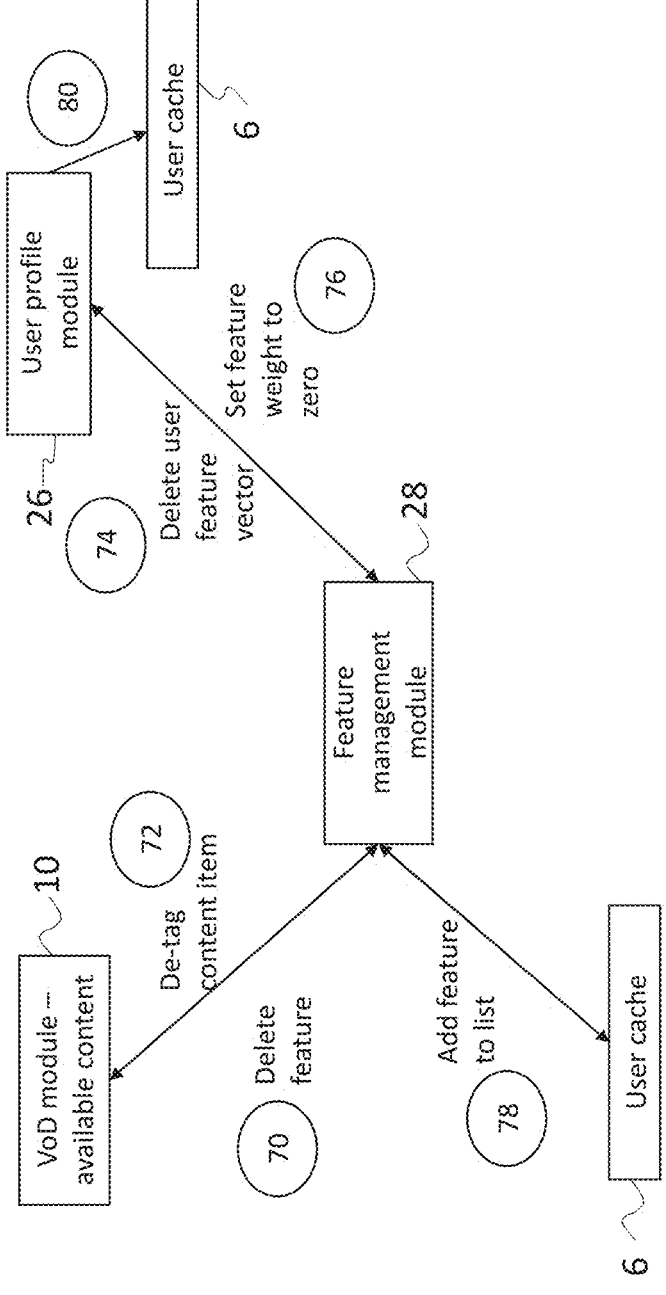
FIG. 6 is a simplified schematic of a portion of the system of FIG. 2 showing connections for correcting biasing feature distribution.

Turning now to FIG. 6, examples of corrective action taken by the feature management module 28 (step 58 of FIG. 5) are illustrated. As shown at 70 and 72, the feature management module 28 communicates with one of the modules having content items, e.g., modules 8, 10, 12. While VoD module 10 is illustrated, one of skill in the art will appreciate any one or more of the modules may be present. The management module 28 instructs the module 10 to delete the feature, i.e., delete the metadata, from all content items in the content catalog in the module 10 having the tagged feature (70). Alternatively, the module 28 may instruct the module 10 to de-tag the feature, i.e., remove the associated between the feature (metadata) and the content item, from the matching content items in the stored catalog (72).

As an alternative, the feature management module 28 may delete the user feature vector at 74 by communicating with the user profile module 26. The user feature is the element in the user profile which corresponds to the feature. Thus, when the number of content items tagged with the feature exceed the threshold, that user feature vector, if present in the user profile, is deleted. Alternatively, the weight of the user feature vector may be set to zero at 76. The user profile module 26 deletes the user feature vector or sets the weight of the vector to zero in the user profile stored in the second storage resource (cache 6) at 80. This effectively removes the user feature vector from any content recommendation generation as it is not included in a scoring function since it has a weight of zero.

In addition to communicating with the modules (e.g., VoD module 10) storing the content items at 70 and 72, or communicating with the user profile module 26 at 74 and 76, the feature management module may add the feature to a list stored in the user cache 6 at 78. The list may also be stored in other locations, such as the hard disk storage 4 Alternatively, the list may be stored in the hard disk storage 4. The list is used by the feature management module during a batch or incremental ingest, i.e., when applying tags to content items. The list is a list of biased features. All features on the list exceed the threshold when applied to the content items. The feature management module 28 accesses the list during a content item ingest. The module 28 does not apply/tag any of the features on the list to the content items, or removes features already applied to the content items, e.g., by a content creator/distributor, if they are on the list. In this manner, no content item is ingested with a feature already known to be a biased feature, i.e., known to exceed a threshold.

As discussed the features may be biased features if the number of content items in the catalog exceeds a threshold. Turning now to Tables 1 and 2, exemplary feature distributions are presented.

Table 1 is a feature distribution of content items in a VoD content catalog. As shown in Table 1, the number of content items tagged with the feature "scripted" is 9900 out of 15000 which represent 66% of the content catalog.

TABLE 1

| Feature distribution in VoD content items | | |
| --- | --- | --- |
| Feature | Count | Percentage Distribution |
| scripted | 9900 | 66% |
| light-hearted | 1350 | 9% |
| funny | 900 | 7% |
| happy | 750 | 7% |
| romantic | 600 | 6% |

TABLE 1-continued

| Feature distribution in VoD content items | | |
|---|---|---|
| Feature | Count | Percentage Distribution |
| tense | 450 | 6% |
| scary | 450 | 4% |
| suspenseful | 450 | 4% |
| gory | 300 | 4% |
| TOTAL | 15000 | n/a |

The high distribution of the feature "scripted" would result in the content recommendation module (CRE) 22 searching approximately 66% of the content catalog if the user profile included this feature vector. This could result in performance degradation. Further, as the distribution of this feature is high, it likely a user will view the content items tagged with this feature. Thus, the user profile will include a user feature vector corresponding with this feature. This may cause performance degradation when the CRE 22 is generated a content recommendation using a scoring function which uses the user feature vector.

Accordingly, the feature "scripted" is a biased feature. The other features in Table 1 have distributions of less than 10% are not therefore non-biased features. These features are likely not problematic, or at least less problematic.

Table 2 is a feature distribution of content items in a PVR content catalog. As shown in Table 2, the number of content items tagged with the feature. "

TABLE 2

| Feature distribution in PVR content items | | |
|---|---|---|
| Feature | Count | Percentage Distribution |
| recent | 3920 | 28% |
| 2020s | 3220 | 23% |
| 2010s | 3220 | 23% |
| 2000s | 2660 | 19% |
| 1990s | 1820 | 13% |
| 1980s | 1680 | 12% |
| 1970s | 1540 | 11% |
| TOTAL | 140000 | n/a |

As shown in Table 2, all of the features have a distribution of greater than 10% which may cause performance issues during content generation. Thus, all of the features may be biased features.

Each individual feature described herein is disclosed in isolation and any combination of two or more features is disclosed to the extent that such features or combinations are capable of being carried out based on the present specification as a whole in the light of the common general knowledge of one of skill in the art, irrespective of whether such features or combination of features solve any problems disclosed herein, and without limitation to the scope of the claims. Aspects of the disclosure may consist of any such individual feature or combination of features. In view of the foregoing description it will be evident to one of skill in the art that various modifications may be made within the scope of the disclosure.

It should be understood that the examples provided are merely exemplary of the present disclosure, and that various modifications may be made thereto.

What is claimed is:

1. A method of managing feature distribution in content of a content catalog for a content distribution system having a plurality of users, the method comprising determining a number of content items in the content catalog tagged with a feature; and taking corrective action responsive to determining that the number of content items in the content catalog tagged with the feature exceeds a threshold, wherein taking corrective action comprises ignoring the feature in a content scoring function, and wherein determining comprises:

determining that a first number of tagged content items is greater than a second number of tagged content items, the first number of tagged content items tagged with a first feature and the second number of tagged content items tagged with a second feature.

2. The method of claim 1, wherein the feature is present in a user profile.

3. The method of claim 1, further comprising determining the one or more features in the user profile stored in a second storage resource, wherein the user profile is also stored in a first storage resource, the first storage resource is less rapidly readable than the second storage resource.

4. The method of claim 3, wherein taking corrective action comprises modifying a weight of a user feature vector of the user profile stored in the second storage resource, the user feature vector corresponding to the feature.

5. The method of claim 1, wherein determining comprises:

determining a distribution of the feature in the tagged content items and untagged content items; and determining if the number of tagged content items in the distribution exceeds the threshold.

6. The method of claim 1, wherein taking corrective action comprises: taking corrective action in in response to determining that the first number of tagged content items is greater than the second number of tagged content items.

7. The method of claim 6, wherein taking corrective action comprises:

de-tagging the first feature from the first number of tagged content items and maintaining the second feature from the second number of tagged content items.

8. The method of claim 1, further comprising, prior to the determining, tagging one or more content items with the feature.

9. The method of claim 1, wherein determining the number of content items tagged with the feature occurs in response to a trigger event.

10. The method of claim 1, wherein taking corrective action comprises at least one of: de-tagging the feature from the content items, ignoring the feature in a content scoring function, or communicating the feature to a content recommendation engine (CRE), the CRE adapted to generate one or more content recommendations responsive to one or more content requests from a user of a plurality of users.

11. The method of claim 1, wherein taking corrective action comprises notifying a client that the threshold has been exceeded.

12. The method of claim 1, wherein taking corrective action comprises removing the feature from the tagged content items.

13. The method of claim 12, wherein removing the feature comprises de-tagging the feature from the tagged content items.

14. The method of claim 1, wherein the threshold is a percentage of a total number of content items.

15. The method of claim 1, wherein taking corrective action comprises modifying a scoring function stored in a second storage resource, the scoring function also stored in a first storage resource.

16. The method of claim 15, wherein modifying the scoring function comprises modifying a weight of a user feature vector.

17. A non-transitory computer-readable medium having computer program code stored thereon, the program code executable by a processor to perform the method of claim 1.

18. A content recommendation system comprising a content recommendation engine (CRE) for generating one or more content recommendations responsive to one or more content requests from a user of a plurality of users and a feature management module, the feature management module adapted to:

determine that a number of tagged content items exceeds a threshold; and take corrective action in response to determining the number of tagged content items exceeds the threshold, wherein the feature management module is adapted to ignore the feature in a content scoring function, and determine that a first number of tagged content items is greater than a second number of tagged content items, the first number of tagged content items tagged with a first feature and the second number of tagged content items tagged with a second feature.

\* \* \* \* \*